(12) United States Patent
Pantalone, III et al.

(10) Patent No.: US 10,562,641 B2
(45) Date of Patent: Feb. 18, 2020

(54) AFT EXHAUST SYSTEM FOR ROTARY WING AIRCRAFT

(71) Applicant: Sikorsky Aircraft Corporation, Stratford, CT (US)

(72) Inventors: Joseph Pantalone, III, Guilford, CT (US); Ashley DeVito, Newtown, CT (US); John S. Chapkovich, III, Derby, CT (US); Steven D. Weiner, Orange, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 863 days.

(21) Appl. No.: 14/049,735

(22) Filed: Oct. 9, 2013

(65) Prior Publication Data

US 2014/0215999 A1   Aug. 7, 2014

Related U.S. Application Data

(60) Provisional application No. 61/711,962, filed on Oct. 10, 2012.

(51) Int. Cl.
*F02K 1/82* (2006.01)
*B64D 33/04* (2006.01)
(Continued)

(52) U.S. Cl.
CPC .............. *B64D 33/04* (2013.01); *B64C 27/04* (2013.01); *B64C 27/10* (2013.01);
(Continued)

(58) Field of Classification Search
CPC ......... B64D 37/04; B64C 27/04; F02K 1/825; F02K 1/82; F02K 3/072; F23R 2900/00017; F23R 2900/00018
(Continued)

(56) References Cited

U.S. PATENT DOCUMENTS 2,486,272 A * 10/1949 Gazda .................... B64C 27/82
239/265.35
3,112,616 A * 12/1963 Adamson ................. B64C 9/38
239/265.27

(Continued)

FOREIGN PATENT DOCUMENTS

| EP | 1849984 A1 | 10/2007 |
|---|---|---|
| WO | 2007106188 A2 | 9/2007 |
| WO | 2012064344 A1 | 5/2012 |

OTHER PUBLICATIONS

Kyle Sherer, Jun. 2, 2008, Newsatlas.com, https://newatlas.com/sikorskys-coaxial-helicopter-x2-technology/9402/.*

(Continued)

*Primary Examiner* — Todd E Manahan
*Assistant Examiner* — Eric W Linderman
(74) *Attorney, Agent, or Firm* — Cantor Colburn LLP

(57) ABSTRACT

An exhaust system for reducing infrared emissions of a rotary wing aircraft includes a duct assembly having an inlet portion and an outlet portion; the inlet portion configured to receive exhaust from an engine of the aircraft; and the outlet portion coupled to the inlet portion, the outlet portion having an outlet duct with an outlet opening, the outlet duct configured expel an emission containing engine exhaust proximate to a tail fairing of the rotary wing aircraft.

15 Claims, 5 Drawing Sheets

(51) Int. Cl.

| | | |
|---|---|---|
| *F02K 1/40* | (2006.01) | |
| *B64C 27/04* | (2006.01) | |
| F02C 7/00 | (2006.01) | |
| F02K 3/072 | (2006.01) | |
| B64C 27/10 | (2006.01) | |
| B64C 27/82 | (2006.01) | |

(52) U.S. Cl.
CPC .................. *B64C 2027/8236* (2013.01); *B64D 2033/045* (2013.01); *F02C 7/00* (2013.01); *F02K 1/40* (2013.01); *F02K 1/825* (2013.01); *F02K 3/072* (2013.01)

(58) Field of Classification Search
USPC .......................................................... 60/39.5
See application file for complete search history.

(56) References Cited

U.S. PATENT DOCUMENTS

| | | | | |
|---|---|---|---|---|
| 3,540,680 | A * | 11/1970 | Peterson | B64C 27/82 244/17.19 |
| 3,658,279 | A * | 4/1972 | Robertson | B64C 23/005 244/207 |
| 3,807,662 | A * | 4/1974 | Velazquez | B64C 27/82 239/265.19 |
| 3,981,448 | A * | 9/1976 | Demogenes | B64D 33/04 239/127.3 |
| 4,004,416 | A * | 1/1977 | Amelio | F02K 1/825 239/127.3 |
| 4,005,823 | A * | 2/1977 | Thayer | B64C 9/38 239/265.37 |
| 4,007,587 | A * | 2/1977 | Banthin | B64D 33/04 239/127.3 |
| 4,312,480 | A * | 1/1982 | Miller | B64D 33/04 239/127.3 |
| 4,355,507 | A * | 10/1982 | Coffey | F02K 1/822 110/157 |
| RE31,591 | E * | 5/1984 | Drakeley | B64C 25/423 181/222 |
| 4,660,785 | A * | 4/1987 | Munski | B64C 27/82 244/17.19 |
| 4,711,415 | A * | 12/1987 | Binden | B64C 27/325 244/17.19 |
| D297,005 | S * | 8/1988 | Whyte | B64C 27/82 D12/327 |
| 4,791,783 | A * | 12/1988 | Neitzel | F01D 17/162 60/226.3 |
| 4,928,907 | A * | 5/1990 | Zuck | B64C 27/26 244/48 |
| 5,115,996 | A * | 5/1992 | Moller | B64C 29/0025 239/265.19 |
| 5,131,603 | A * | 7/1992 | Meyers | B64C 27/82 239/265.19 |
| 5,174,523 | A * | 12/1992 | Balmford | B64C 27/12 244/17.11 |
| 5,205,512 | A * | 4/1993 | Rumberger | B64C 27/82 244/17.19 |
| 5,232,183 | A | 8/1993 | Rumberger | |
| 5,269,132 | A * | 12/1993 | Loucks | F02K 1/825 239/127.1 |
| 5,690,280 | A * | 11/1997 | Holowach | F02K 1/006 239/265.19 |
| 5,694,766 | A * | 12/1997 | Smereczniak | F02K 1/002 239/265.17 |
| 5,699,662 | A * | 12/1997 | Born | B64D 33/04 244/52 |
| 5,699,965 | A * | 12/1997 | Amelio | B64D 33/04 239/127.3 |
| 5,699,966 | A * | 12/1997 | Beverage | F02K 1/006 239/265.19 |
| 5,738,301 | A * | 4/1998 | Francois | B64C 27/26 244/17.19 |
| 6,098,921 | A * | 8/2000 | Piasecki | B64C 27/14 244/17.19 |
| 6,122,907 | A * | 9/2000 | Frawley | B64D 33/04 239/265.17 |
| D526,269 | S * | 8/2006 | Eadie | F02K 3/025 D12/327 |
| 7,162,859 | B2 * | 1/2007 | Franchet | F02K 3/025 60/204 |
| 7,731,121 | B2 * | 6/2010 | Smith | B64C 27/82 244/17.19 |
| 9,528,375 | B2 * | 12/2016 | Alber | F01D 5/02 |
| 2003/0126854 | A1 * | 7/2003 | Cazenave | F01D 9/065 60/226.1 |
| 2005/0217239 | A1 * | 10/2005 | Wollenweber | B64D 33/04 60/262 |
| 2005/0268595 | A1 * | 12/2005 | Steyer | B64D 33/04 60/204 |
| 2006/0230744 | A1 * | 10/2006 | Beutin | F02K 1/006 60/231 |
| 2007/0022757 | A1 * | 2/2007 | Zack | B64D 33/04 60/772 |
| 2007/0028622 | A1 * | 2/2007 | Steyer | F02K 1/48 60/772 |
| 2007/0028623 | A1 * | 2/2007 | Steyer | F02K 1/825 60/772 |
| 2007/0125907 | A1 * | 6/2007 | Lappos | B64C 27/14 244/60 |
| 2007/0251211 | A1 * | 11/2007 | Daris | B64D 33/04 60/230 |
| 2007/0266712 | A1 * | 11/2007 | Brunet | B64D 33/04 60/771 |
| 2008/0016873 | A1 * | 1/2008 | Harefors | B64C 15/02 60/770 |
| 2008/0093500 | A1 * | 4/2008 | Smith | B64C 27/82 244/17.19 |
| 2008/0156900 | A1 * | 7/2008 | Hauer | F02K 1/566 239/265.29 |
| 2008/0236138 | A1 * | 10/2008 | Gustafsson | B64D 33/04 60/226.1 |
| 2008/0237392 | A1 * | 10/2008 | Piasecki | B64C 27/26 244/6 |
| 2009/0025362 | A1 * | 1/2009 | Chapkovich | F02K 1/825 60/39.5 |
| 2009/0045294 | A1 * | 2/2009 | Richardson | B64C 3/385 244/7 A |
| 2009/0139202 | A1 * | 6/2009 | Agrawal | F02C 7/36 60/226.3 |
| 2009/0140182 | A1 * | 6/2009 | Agrawal | B64C 27/22 251/5 |
| 2009/0158703 | A1 * | 6/2009 | Petty | F02K 1/386 60/230 |
| 2009/0189011 | A1 | 7/2009 | Bahadir | |
| 2009/0288388 | A1 | 11/2009 | Bies et al. | |
| 2010/0127114 | A1 * | 5/2010 | Nakayama | B64C 27/12 244/17.21 |
| 2011/0272519 | A1 * | 11/2011 | Challis | B64C 27/26 244/6 |
| 2012/0305699 | A1 * | 12/2012 | Cole | B64C 27/04 244/17.21 |
| 2012/0318911 | A1 * | 12/2012 | Robertson | B64C 27/82 244/52 |
| 2013/0104557 | A1 * | 5/2013 | McMahon | F02K 1/825 60/772 |
| 2013/0334359 | A1 * | 12/2013 | Robertson | B64C 3/54 244/6 |
| 2014/0084080 | A1 * | 3/2014 | Robertson | B64D 33/06 239/127.3 |
| 2014/0096501 | A1 * | 4/2014 | Pantalone, III | B64D 33/04 60/39.5 |
| 2014/0217231 | A1 * | 8/2014 | Pantalone, III | B64C 27/82 244/17.21 |

(56) References Cited

U.S. PATENT DOCUMENTS

2016/0201566 A1\* 7/2016 Dillard ..................... F02K 1/82
  415/182.1
2016/0333797 A1\* 11/2016 Laramee ................ B64D 33/04

OTHER PUBLICATIONS

EP Communication; Extended European Search Report; Application No. 13187935.5-1754/2719621; dated Sep. 25, 2017; pp. 1-8.

\* cited by examiner

AFT EXHAUST SYSTEM FOR ROTARY WING AIRCRAFT

CROSS REFERENCE TO RELATED APPLICATIONS

This application claims priority to U.S. provisional application Ser. No. 61/711,962 filed Oct. 10, 2012, the entire contents of which are incorporated herein by reference.

FIELD OF INVENTION

The subject matter disclosed herein relates generally to rotary wing aircraft and, more particularly, to an aft exhaust system for a rotary wing aircraft. The aft exhaust system reduces line of sight to infrared emissions and reduces engine exhaust impingement on aircraft structure.

DESCRIPTION OF RELATED ART

The exhaust ducting from a gas turbine engine of a rotary wing aircraft is a source of infrared (IR) energy which may be detected by heat seeking missiles and/or various forms of infrared imaging systems for targeting/tracking purposes. With respect to the former, generally speaking, a heat-seeking missile obtains directional cues from the infrared energy generated by the engine exhaust such that the amount of infrared energy given off is one of the primary determining factors of missile accuracy. Regarding the latter, infrared imaging systems detect and amplify the infrared energy for detection and/or targeting.

Current IR suppression systems are utilized on many military aircraft including rotary wing aircraft to provide IR signature reduction. Future IR threats, however, will require even greater levels of IR signature reduction. Generally, IR suppression systems are designed to: (a) reduce the infrared energy below a threshold level of a perceived threat; (b) maintain engine performance; and (c) reduce weight and packaging associated therewith. Other consequences may include: (i) reducing system or configuration complexity to reduce fabrication and maintainability costs; and (ii) reducing the external aerodynamic drag produced by such IR suppressor systems.

Current suppression systems for rotary wing aircraft are primarily designed to provide significant IR signature reduction during a hover flight profile. Generally speaking, current suppressor systems operate by mixing the high temperature exhaust flow with cool airflow supplied by a mixing duct which communicates with an engine exhaust duct. The mixing of large amounts of ambient air with the engine exhaust may significantly reduce the overall gas temperature prior to discharging the engine exhaust overboard, thereby lowering the aircraft IR signature.

It is also desirable to minimize impingement of hot engine exhaust onto adjacent aircraft structure so that the generation of "hot spots" separate from the primary source associated with the nozzle/exhaust plume are avoided. Disadvantageously, the mixing operation may reduce the velocity of the exhaust flow such that the exhaust velocity may be too low to expel the exhaust far enough from the fuselage to avoid such "hot spots." A further disadvantage is that if the exhaust gas does not have enough velocity to escape rotor downwash, the exhaust gas may be re-ingested into the engine which reduces engine efficiency.

BRIEF DESCRIPTION OF THE DRAWINGS

Referring now to the drawings wherein like elements are numbered alike in the several FIGURES.

DETAILED DESCRIPTION

Figure 1:
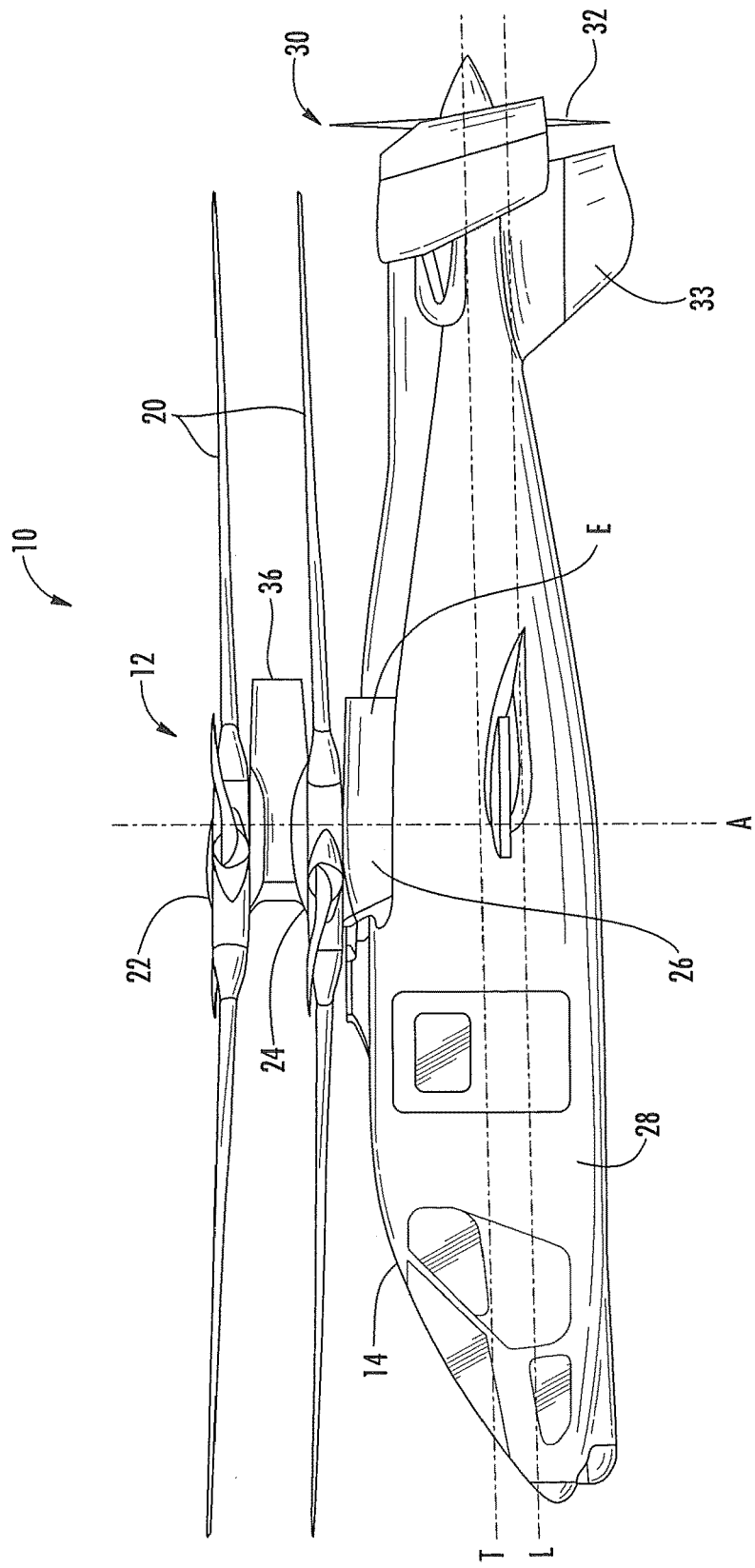
FIG. 1 depicts a rotary wing aircraft in an exemplary embodiment.

FIG. 1 illustrates an exemplary vertical takeoff and landing (VTOL) rotary-wing aircraft 10 having a dual, counter-rotating, coaxial rotor system 12 which rotates about an axis of rotation A. The aircraft 10 includes an airframe 14 which supports the dual, counter rotating, coaxial rotor system 12 as well as an optional translational thrust system 30 which provides translational thrust generally parallel to an aircraft longitudinal axis, L. Although a particular aircraft configuration is illustrated in this non-limiting embodiment, other rotary-wing aircraft will also benefit from embodiments of the invention.

The dual, counter-rotating, coaxial rotor system 12 includes an upper rotor system and a lower rotor system. Rotor system 12 includes a plurality of rotor blades 20 mounted to a rotor hub 22, 24 for rotation about rotor axis of rotation A. A plurality of the main rotor blades 20 project substantially radially outward from the hubs 22, 24. Any number of blades 20 may be used with the rotor system 12. The rotor system 12 includes a rotor hub fairing 36 generally located between and around the upper and lower rotor systems such that the rotor hubs 22, 24 are at least partially contained therein. The rotor hub fairing 36 provides drag reduction.

A main gearbox 26 may be located above the aircraft cabin 28 and drives the rotor system 12. The translational thrust system 30 may be driven by the same main gearbox 26 which drives the rotor system 12. The main gearbox 26 is driven by one or more engines (illustrated schematically at E).

The translational thrust system 30 may be mounted to the rear of the airframe 14 with a translational thrust axis, T, oriented substantially horizontal and parallel to the aircraft longitudinal axis L to provide thrust for high-speed flight. The translational thrust system 30 includes a pusher propeller 32 mounted at an aerodynamic tail fairing 33. The translational thrust axis, T, corresponds to the axis of rotation of propeller 32. Although a tail mounted translational thrust system 30 is disclosed in this illustrated non-limiting embodiment, it should be understood that any such system or other translational thrust systems may alternatively or additionally be utilized.

Figure 2:
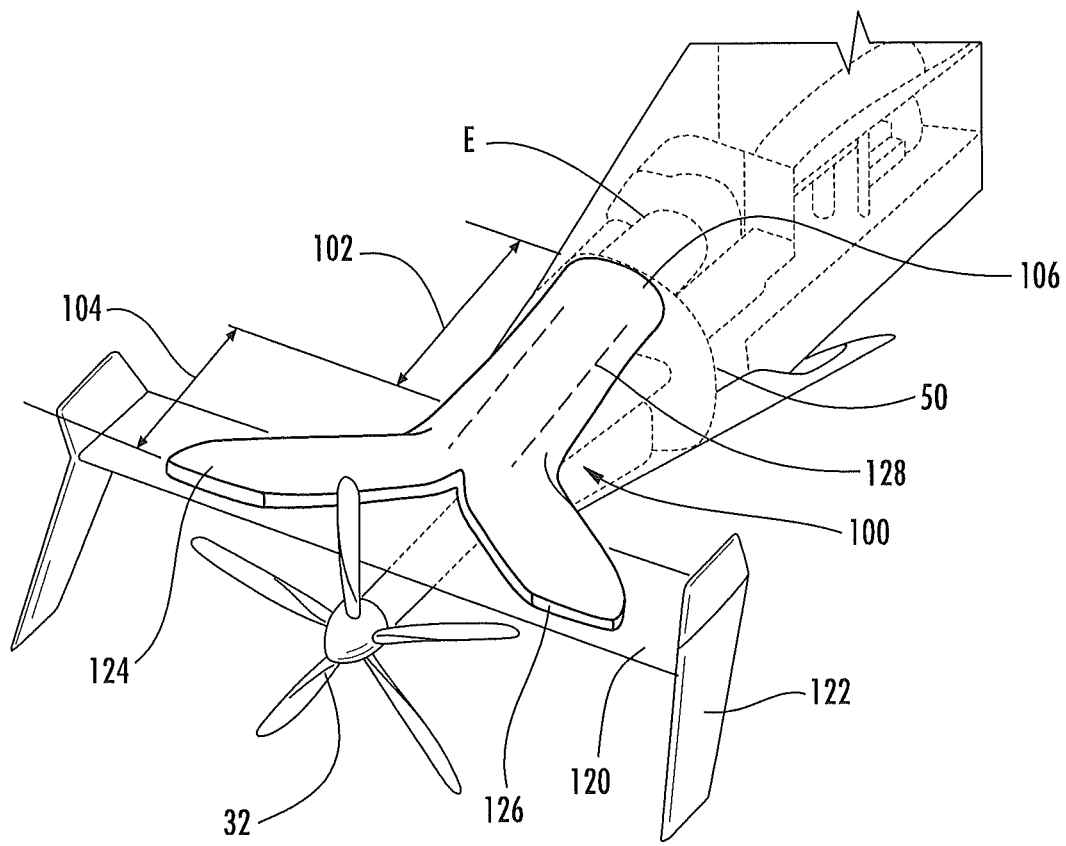
FIG. 2 depicts an aft exhaust system in an exemplary embodiment.

As noted above, exhaust from engine E can increase the IR signature of the aircraft 10, either directly or by impingement on surfaces of the aircraft 10. To reduce exhaust impingement and restrict line of sight to the exhaust, embodiments described herein employ an aft-vectored exhaust system to expel an emission containing engine exhaust proximate to the tail fairing 33 of the rotary wing aircraft. FIG. 2 depicts an aft exhaust system 100 in an exemplary embodiment. Shown in FIG. 2 is engine, E, and a firewall 50. Firewall 50 includes one or more openings for routing exhaust to aft exhaust system 100.

The aft exhaust system 100 is a duct assembly having an inlet portion 102 and an outlet portion 104. Inlet portion 102 receives exhaust from engine E. Outlet portion 104 directs the engine exhaust proximate to the tail fairing 33, on both sides of the thrust axis of the translational thrust system (e.g., rotational axis of propeller 32). Outlet portion 104 terminates proximate to an aft edge of horizontal stabilizer 120, which is joined to vertical stabilizers 122.

Inlet portion 102 is a generally straight duct having an exhaust inlet 106 coupled to an opening in firewall 50 to receive exhaust from engine E. Exhaust inlet 106 may be generally circular. As inlet portion 102 progresses in an aft direction, the cross section of the inlet portion 102 becomes more rectangular, with a height (along axis A) less than a width along the longitudinal axis of horizontal stabilizer 120.

Outlet portion 104 splits into two outlet ducts 124, positioned on opposite sides of propeller 32. Outlet ducts 124 may be embedded internally to the horizontal stabilizer 120. Outlet ducts 124 and outlet duct openings 126 are generally rectangular and with a height (along axis A) less than a width along the longitudinal axis of horizontal stabilizer 120. Outlet duct openings 126 and may be parallel to an aft edge of horizontal stabilizer 120. In alternate embodiments, outlet duct openings 126 in outlet ducts 124 may be angled away from propeller 32, towards vertical stabilizers 122. Horizontal stabilizer 120 may include aft exhaust openings to eject emissions from outlet ducts 124.

To provide for cooling of the emission from outlet ducts 124, openings 128 may be formed in the aft exhaust system in one or both of the inlet portion 102 and outlet portion 104. Openings 128 receive secondary air from, for example, compartments within aircraft 14. The secondary air flows into the compartment housing the aft exhaust system 100 and flows into openings 128 to cool the exhaust prior to emission. The number, shape and size of openings 128 may be varied to provide cooling of exhaust emissions, maintain suitable flow through the aft exhaust system 100 and maintain engine backpressure at suitable levels.

Figure 3:
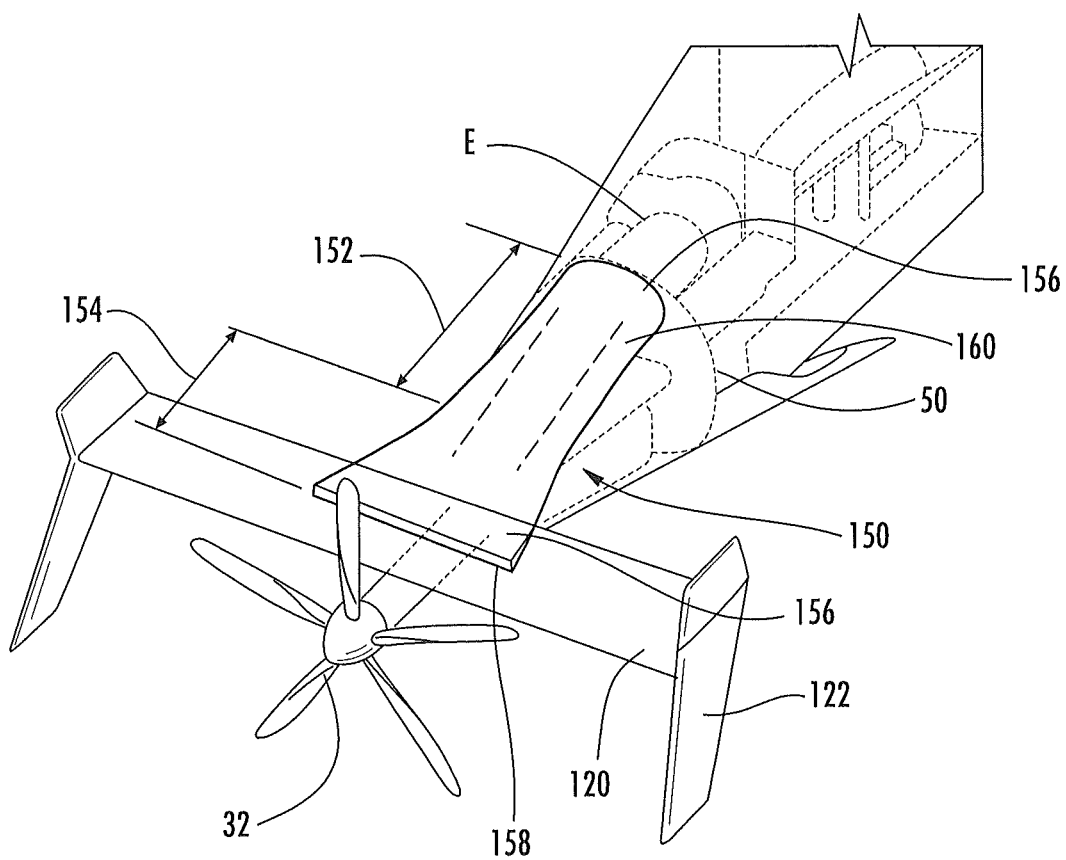
FIG. 3 depicts an aft exhaust system in an exemplary embodiment.

FIG. 3 depicts an aft exhaust system 150 in an exemplary embodiment. Shown in FIG. 3 is engine, E, and a firewall 50. Firewall 50 includes one or more openings for routing exhaust to aft exhaust system 150.

The aft exhaust system 150 is a duct assembly having an inlet portion 152 and an outlet portion 154. Inlet portion 152 receives exhaust from engine E. Outlet portion 154 directs the engine exhaust proximate to the tail fairing 33. Outlet portion 154 may be aligned with or centered on a thrust axis of a translational thrust system 30 (e.g., the rotational axis of propeller 32). Outlet portion 154 terminates proximate to a horizontal stabilizer 120, which is joined to vertical stabilizers 122.

Inlet portion 152 is a generally straight duct having an exhaust inlet 156 coupled to an opening in firewall 50 to receive exhaust from engine E. Exhaust inlet 156 may be generally circular. As inlet portion 152 progress in an aftward direction, the cross section of the inlet portion 152 becomes more rectangular, with a height (along axis A) less than a width along the longitudinal axis of horizontal stabilizer 120.

Outlet portion 154 fans into outlet duct 156 that is aligned with or centered on a thrust axis of a translational thrust system 30 (e.g., the rotational axis of propeller 32). In other words, in an aftward direction, the outlet portion height decreases (along axis A) while the outlet portion width increases, along the longitudinal axis of horizontal stabilizer 120. Outlet duct 156 may be embedded internally to the horizontal stabilizer 120. Outlet duct 156 and outlet duct opening 158 are generally rectangular with a height (along axis A) less than a width along the longitudinal axis of horizontal stabilizer 120. Outlet duct opening 158 may be parallel to an aft edge of horizontal stabilizer 120. Horizontal stabilizer 120 may include aft exhaust openings to eject emissions from outlet duct 156.

To provide for cooling of the emission from outlet ducts 156, openings 160 may be formed in the aft exhaust system in one or both of the inlet portion 152 and outlet portion 154. Openings 160 receive secondary air from, for example, compartments within aircraft 14. The secondary air flows into the compartment housing the aft exhaust system 150 and flows into openings 160 to cool the exhaust prior to emission. The number, shape and size of openings 160 may be varied to provide cooling of exhaust emissions, maintain suitable flow through the aft exhaust system 150 and maintain engine backpressure at suitable levels.

Figure 4:
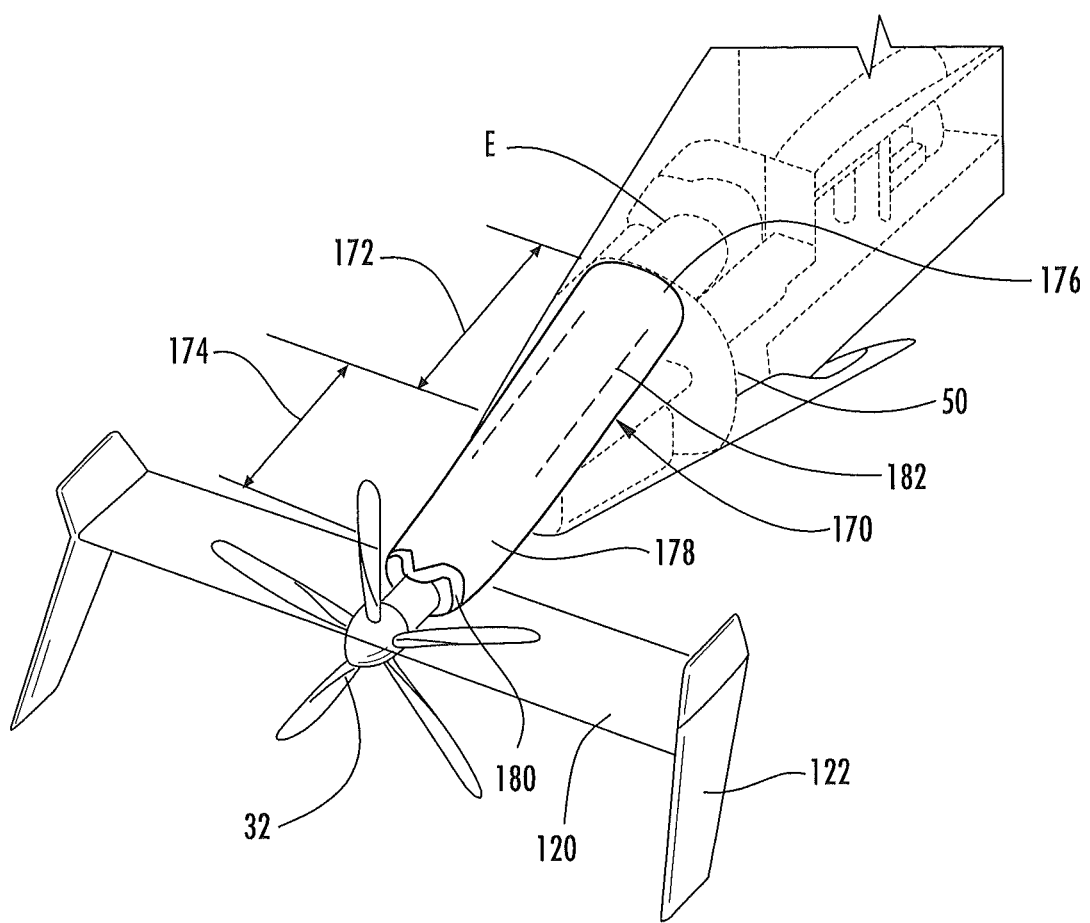
FIG. 4 depicts an aft exhaust system in an exemplary embodiment.

FIG. 4 depicts an aft exhaust system 170 in an exemplary embodiment. Shown in FIG. 4 is engine, E, and a firewall 50. Firewall 50 includes one or more openings for routing exhaust to aft exhaust system 170.

The aft exhaust system 170 is a duct assembly having an inlet portion 172 and an outlet portion 174. Inlet portion 172 receives exhaust from engine E. Outlet portion 174 directs the engine exhaust proximate to the tail fairing 33. Outlet portion 174 may be aligned with or centered on a thrust axis of a translational thrust system 30 (e.g., the rotational axis of propeller 32). Outlet portion 174 terminates proximate to a horizontal stabilizer 120, which is joined to vertical stabilizers 122.

Inlet portion 172 is a generally straight duct having an exhaust inlet 176 coupled to an opening in firewall 50 to receive exhaust from engine E. Exhaust inlet 176 may be generally circular. As inlet portion 172 progress in an aftward direction, the cross section of the inlet portion 172 remains generally circular.

Outlet portion 174 is generally circular and aligned with or centered on a thrust axis of a translational thrust system 30 (e.g., the rotational axis of propeller 32). Outlet duct 178 may be embedded, at least partially, internally to the horizontal stabilizer. Horizontal stabilizer 120 may include aft exhaust openings to eject emissions from outlet duct 178. Outlet duct 178 and outlet duct opening 180 are generally circular and aligned with or centered on a thrust axis of a translational thrust system 30 (e.g., the rotational axis of propeller 32).

To provide for cooling of the emission from outlet ducts 178, openings 182 may be formed in the aft exhaust system 170 in one or both of the inlet portion 172 and outlet portion 174. Openings 182 receive secondary air from, for example, compartments within aircraft 14. The secondary air flows into the compartment housing the aft exhaust system 170 and flows into openings 182 to cool the exhaust prior to emission. The number, shape and size of openings 182 may be varied to provide cooling of exhaust emissions, maintain suitable flow through the aft exhaust system 170 and maintain engine backpressure at suitable levels.

As discussed above, secondary air may be provided to the aft exhaust system to cool the exhaust. Sources of secondary air include engine compartment cooling air, inlet particle separator (IPS) air and avionics cooling air. Other internal sources of secondary air include transmission cooling air, hydraulics cooling air, environmental control system (ECS) air and auxiliary power unit (APU) air. The use of internal air sources as the source for the secondary air provides several benefits. Existing aircraft incur significant weight, momentum drag and susceptibility penalties for multiple inlets and exhausts required to support independent cooling of multiple heat sources, including engine, avionics, transmission, hydraulic, environmental control system (ECS) and auxiliary power unit (APU) components. To support the low drag and low weight objectives, embodiments of the invention employ an internally linked thermal management architecture to harness the cooling potential of secondary airflow for primary exhaust cooling. Potential secondary air sources include engine compartment cooling, inlet particle separator (IPS) exhaust, avionics cooling air, transmission oil cooler exhaust, hydraulic oil cooler exhaust, ECS exhaust, and APU exhaust.

Figure 5:
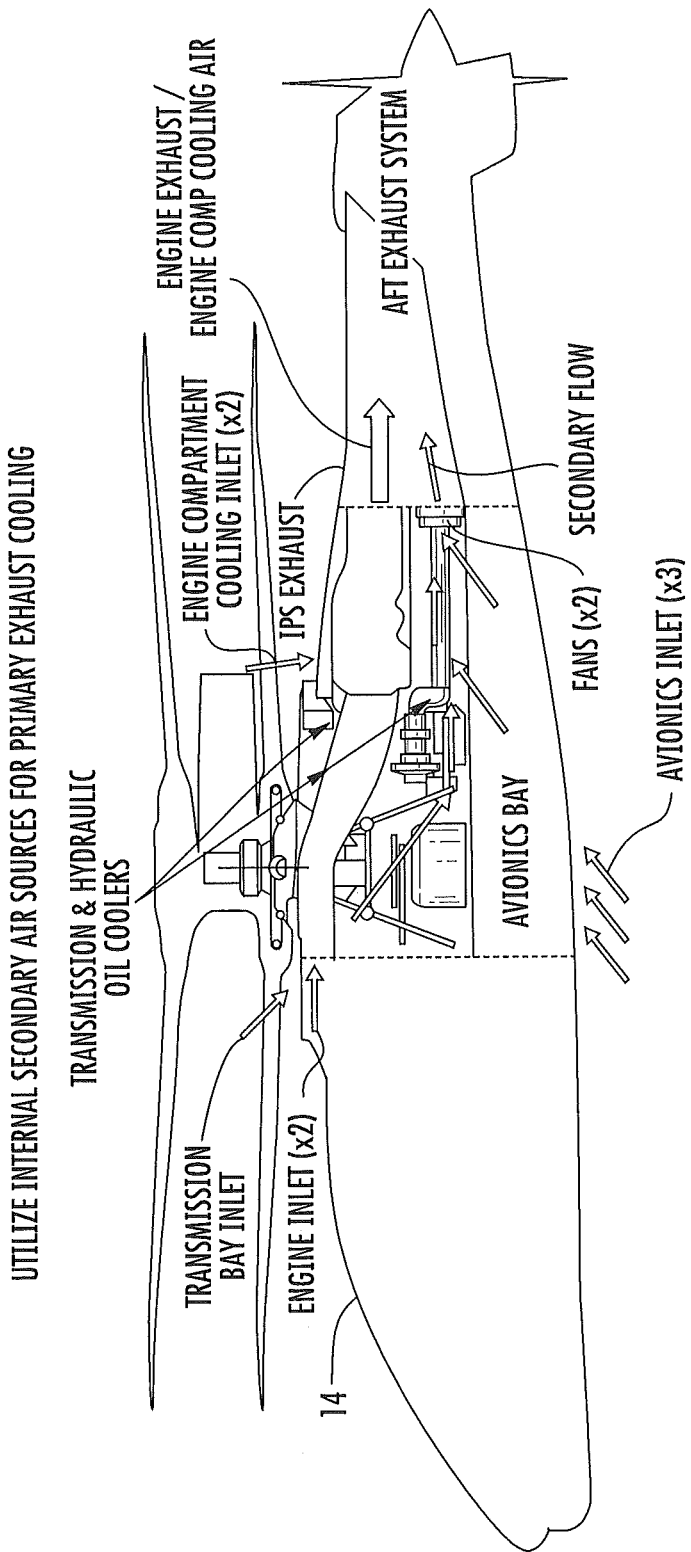
FIG. 5 depicts flow of multiple secondary air sources through an airframe in an exemplary embodiment.

FIG. 5 depicts the flow a multiple secondary air sources through the airframe 14 in an exemplary embodiment. The secondary air is drawn from internal compartments and then mixed with the exhaust from engine E at the aft exhaust system (100, 150, 170) through openings (128, 160, 182) as described above. Using secondary air from compartments of the airframe 14 reduces or eliminates the need for additional inlets and exhausts, scoops, air rams, etc. This reduces drag on the aircraft and lessens aircraft weight.

Embodiments provide an aft exhaust system that reduces impingement of exhaust emissions on the aircraft. The tail fairing, or empennage, serves to block a line sight to the emissions of the aft exhaust system. The aft exhaust system releases the exhaust far enough aft to avoid tail cone impingement and reduce the drag impact of the aft vectored exhaust.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. An exhaust system for reducing infrared emissions of a rotary wing aircraft, the exhaust system comprising:
   a duct assembly having an inlet portion and an outlet portion, the duct assembly being positioned within a chamber of an airframe;
   the inlet portion being configured to receive exhaust from an engine of the aircraft, wherein a cross-section of the inlet portion varies in an aft direction;
   the outlet portion being coupled to the inlet portion, the outlet portion having an outlet duct with an outlet opening disposed at an aft end of the outlet duct, opposite the inlet portion, the outlet opening being configured to expel an emission containing engine exhaust proximate to a tail fairing an aft end of the rotary wing aircraft on both sides of a thrust axis of a translational thrust system of the rotary wing aircraft; and
   a plurality of openings distinct from the inlet opening and the outlet opening formed in at least one of the inlet portion and the outlet portion of the duct assembly, wherein air provided to an interior of the duct via the plurality of openings such that the air is entrained with the exhaust within an interior of the duct assembly.

2. The exhaust system of claim 1 wherein the outlet duct is configured for placement proximate to horizontal stabilizer of the tail faring of the rotary wing aircraft.

3. The exhaust system of claim 1 wherein the inlet portion includes an inlet duct configured to couple to an opening in a firewall to receive the engine exhaust.

4. The exhaust system of claim 1 wherein the outlet portion includes two outlet ducts.

5. The exhaust system of claim 4 wherein the two outlet ducts are embedded in a horizontal stabilizer of the tail fairing.

6. The exhaust system of claim 4 wherein the two outlet ducts are positioned on opposite sides of a thrust axis of the translational thrust system.

7. The exhaust system of claim 6 wherein the translational thrust system is a propeller, the two outlet ducts positioned on opposite sides of a rotational axis of the propeller.

8. The exhaust system of claim 1 wherein the outlet duct is aligned with a thrust axis of the translational thrust system of the rotary wing aircraft.

9. The exhaust system of claim 1 wherein the outlet duct is centered with a thrust axis of the translational thrust system of the rotary wing aircraft.

10. The exhaust system of claim 1 wherein the inlet portion is circular and the outlet portion is rectangular.

11. The exhaust system of claim 1 wherein the inlet portion is circular and the outlet portion is circular.

12. A rotary wing aircraft comprising:
   a rotor having a plurality of rotor blades;
   an engine for driving the rotor;
   a frame supporting a tail fairing;
   an exhaust system for reducing infrared emissions of the rotary wing aircraft, the exhaust system including:
      a duct assembly having an inlet portion and an outlet portion, the duct assembly being positioned within a chamber of an airframe; the inlet portion including an inlet opening configured to receive exhaust the engine, wherein a cross-section of the inlet portion varies in an aft direction;
      the outlet portion coupled to the inlet portion, the outlet portion having an outlet duct with an outlet opening disposed at an aft end of the outlet duct, opposite the inlet portion, the outlet opening being configured to expel an emission including the engine exhaust proximate to an aft end of the rotary wing aircraft on both sides of a thrust axis of a translational thrust system of the rotary wing aircraft; and
      a plurality of openings distinct from the inlet opening and the outlet opening is formed in at least one of the inlet portion and the outlet portion of the duct assembly, wherein aft provided to an interior of the duct via the plurality of openings such that the air is entrained with the exhaust within an interior of the engine within the duct assembly.

13. The rotary wing aircraft of claim 12 further comprising: a horizontal stabilizer at the tail faring;
   wherein the outlet portion includes two outlet ducts, wherein the two outlet ducts are embedded in the horizontal stabilizer and the two outlet ducts are positioned on opposite sides of a thrust axis at the translational thrust system.

14. The rotary wing aircraft of 13 wherein the translational thrust system is a propeller, the two outlet ducts positioned on opposite sides of a rotational axis of the propeller.

15. The rotary wing aircraft of claim 12 wherein the inlet portion is circular and the outlet portion is rectangular.

* * * * *